No. 783,938. PATENTED FEB. 28, 1905.
M. F. EHLERT.
TWINE HOLDER.
APPLICATION FILED AUG. 14, 1903. RENEWED NOV. 28, 1904.
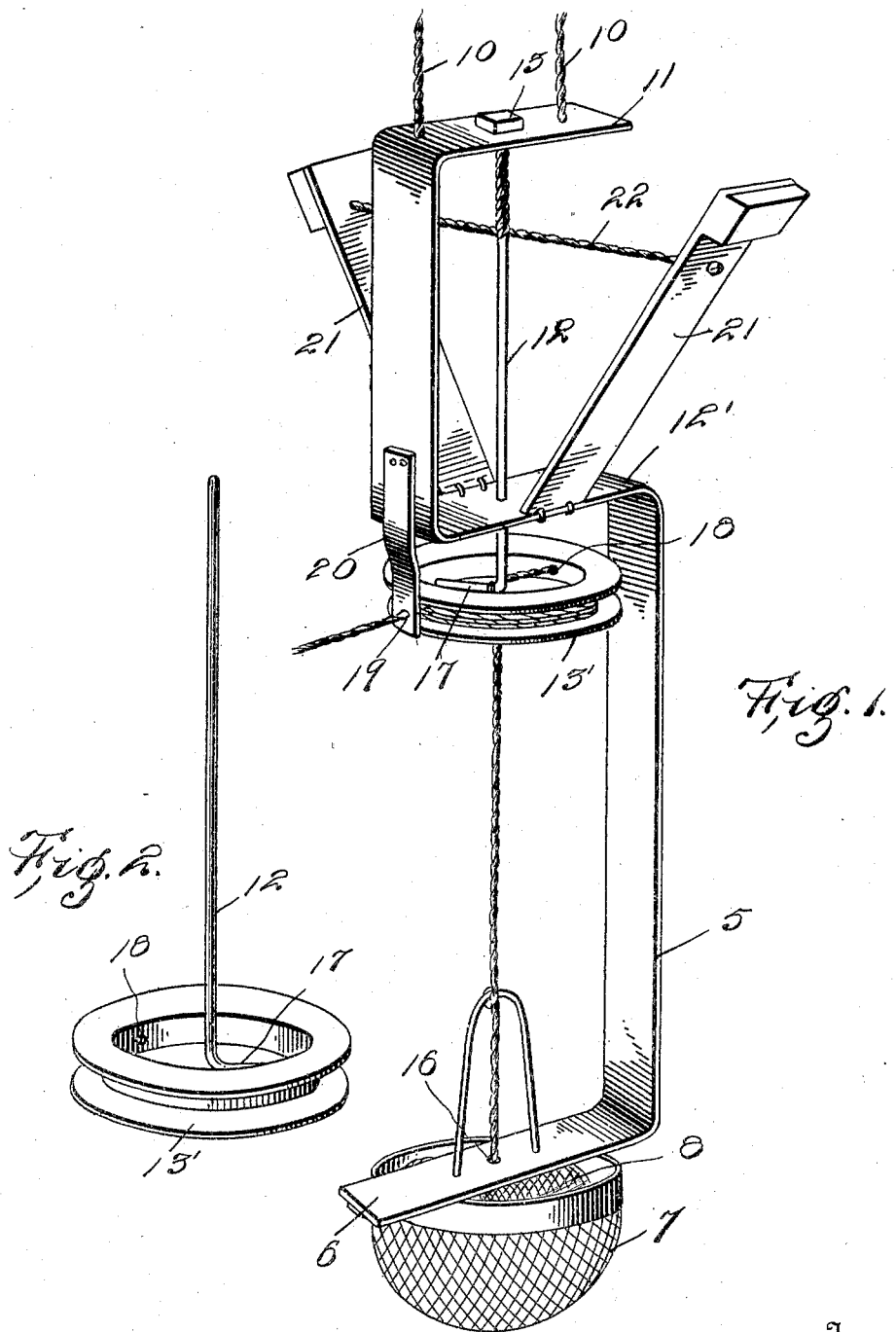

No. 783,938. Patented February 28, 1905.

UNITED STATES PATENT OFFICE.

MAX FREDRICK EHLERT, OF COON RAPIDS, IOWA.

TWINE-HOLDER.

SPECIFICATION forming part of Letters Patent No. 783,938, dated February 28, 1905.

Application filed August 14, 1903. Renewed November 28, 1904. Serial No. 234,645.

*To all whom it may concern:*

Be it known that I, MAX FREDRICK EHLERT, a citizen of the United States, residing at Coon Rapids, in the county of Carroll, State of Iowa, have invented certain new and useful Improvements in Twine-Holders; and I do hereby declare the following to be a full, clear, and exact description of the invention, such as will enable others skilled in the art to which it appertains to make and use the same.

This invention relates to twine-holders; and it has for its object to provide an improved construction which will permit of the twine being readily drawn therefrom and which when the end of the twine is released will operate automatically to wind up the slack of the twine to a certain extent.

In the drawings forming a portion of this specification, and in which like numerals of reference indicate similar parts in the several views, Figure 1 is a perspective view showing a twine-holder embodying the present invention, the parts being in the positions that they assume when the twine is being drawn from the holder. Fig. 2 is a detail view of the winding wheel or drum.

Referring now to the drawings, the present twine-holder comprises a frame 5 of substantially S shape and having a base 6, from which is suspended a basket 7, in which the cord 8 is held. In practice the frame is suspended from the ceiling by means of a cord or chain 10, attached to the upper end thereof. In the upper horizontal members 11 and 12' of the frame are formed vertically-alining bearings, which receive a rotatable rod or shaft 12, having a knob 13 at its upper end which prevents downward displacement. The lower end of the shaft 12 is bent laterally at right angles and then into circular form, so that the main portion of the shaft alines with the axis of the circle. The circular portion of the rod or shaft carries a grooved wheel or drum 13', in the periphery of which is an opening 18. The twine is taken from the holder upwardly through the perforation 16 in the base of the frame, then over the spoke 17, formed by the laterally-turned lower end portion of the shaft 12, then outwardly through the perforation 18 in the periphery of the grooved drum, and finally through the perforation 19 in the finger 20 on the frame. Pivoted to the member 12' of the frame are arms 21, which are weighted at their free ends, and to which arms are attached the ends of a cord 22, the central portion of which is attached to the shaft 12, so that when the shaft is rotated in one direction the cord will be wound thereon to swing the weighted arms upwardly, and when the shaft is released the weighted arms will cause the cord to unwind from the shaft and rotate the latter to wrap the twine in the groove of the drum.

In the use of the holder the end of the twine is grasped and drawn through the eye of the finger on the frame, so that the twine around the drum is unwrapped and the drum, with the shaft, is rotated to wind up the cord 22 and raise the weighted arm, and as the twine is further drawn it passes from the basket through the perforations of the drum and finger. When the proper length of twine has been drawn from the holder and has been cut off, the pivoted arms swing downwardly and rotate the drum, as above described, so that the slack of the twine is wound onto the drum.

What is claimed is—

1. A twine-holder comprising a winding-drum having a central opening, and a radial perforation through its periphery, said drum being disposed to permit of passage of twine through the perforation, means for supporting the twine beyond the drum in position to be wound upon the drum when the latter is rotated, a rotatable shaft on which the drum is fixed, weights pivoted at opposite sides of the shaft, and a cord attached to the weights and shaft and adapted to be wound upon the shaft when the latter is rotated by the drum.

2. A twine-holder comprising a frame having a vertical shaft rotatably mounted therein, a winding-drum fixed upon the shaft and having a central perforation, a twine-support disposed to hold the twine in position for passage therefrom through the perforation of the winding-drum, means for supporting the twine beyond the drum in position to be wound upon the drum when the latter is rotated, arms pivoted to the frame and provided with weights at their free ends, and a cord attached to the arms and to the shaft to be wound thereon when the drum is rotated.

In testimony whereof I affix my signature in presence of two witnesses.

MAX FREDRICK EHLERT.

Witnesses:
HUGH JONES,
JOHN GREEN.